3,335,184
ORTHO - DIISOPROPYLAMINOETHOXYBUTYRO-
PHENONE AND HYDROCHLORIDE THEREOF
Paolo Da Re, Perugia, and Ivo Setnikar, Milan, Italy, assignors, by mesne assignments, to Societe d'Exploitations Chemiques et Pharmaceutiques Seceph S.A., Grisons, Switzerland
No Drawing. Filed July 13, 1964, Ser. No. 382,352
Claims priority, application Italy, July 26, 1963, 37,541/63
2 Claims. (Cl. 260—570.7)

This invention relates to the novel compound o-diisopropylaminoethoxybutyrophenone and its hydrochloride and to methods for preparing same, as well as to the use of same as a local anesthetic.

The novel compounds of the present invention are selected from the class of compounds having the general formula:

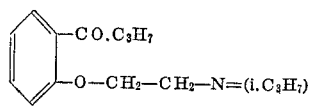

and its hydrochloride.

This hydrochloride is a white crystalline powder having a bitter taste and a melting point of 129°–130° C.

A particularly effective method of preparing o-diisopropylaminoethoxybutyrophenone hydrochloride comprises the following steps:

(1) Condensing, in ethanol, o-hydroxybutyrophenone with diisopropylaminoethyl chloride hydrochloride, in the presence of 2 equivalents of sodium ethylate;
(2) Separating the basic ether thus obtained from solid sodium chloride in the mixture;
(3) Taking up the ether in benzene;
(4) Washing it with sodium hydrate and drying it; and
(5) Precipitating the desired hydrochloride salt from the benzene solution by the addition of ethanolic hydrogen chloride.

In order still better to illustrate the process of the present invention, the following specific example is given merely for purposes of illustration:

A sodium ethylate solution, obtained by dissolving 23 g. of metallic sodium in one liter of absolute ethanol, is charged into a round bottomed, three-necked, five liter flask fitted with stirrer, reflux bulb cooler with $CaCl_2$ closure, and dropping funnel. A solution of 82 g. of o-hydroxybutyrophenone in 250 ml. of absolute ethanol is then added to the flask. To this mixture there are added from the dropping funnel, 98.5 g. of diisopropylaminoethyl chloride hydrochloride, dissolved in 500 ml. of absolute ethanol. The reaction mixture is boiled at reflux on a water bath for 5 hours, is then cooled, and is filtered from the sodium chloride which has separated out upon cooling. Finally, the filtrate is concentrated to dryness.

The oily residue is taken up in 500 ml. of benzene and the benzene solution is then extracted with 3 portions (80 ml. each) of a 10% aqueous solution of sodium hydrate (NaOH), then washed with water and dried with anhydrous sodium sulfate.

The dried solution is filtered and the filtrate treated with ethanolic hydrogen chloride, in slight excess over the theoretical amount required to effect conversion of the basic ether to the desired hydrochloride salt. The solid hydrochloride which forms is filtered off and crystallized from absolute ethanol, the crystallization being started by adding some anhydrous ether. 120 g. of a white, crystalline product are obtained having a melting point of 129°–130° C.

*Analysis.*—Calculated for $C_{18}H_{30}ClNO_2$: Cl, 10.81%; N, 4.27%. Found: Cl, 10.95%; N, 4.36%.

The local anesthetic activity of o-diisopropylaminoethoxybutyrophenone hydrochloride has proved to be such as to make insensible the treated parts of 50% of the animals with concentrations of: 0.75 mg./ml., when administered by instillation in the conjunctival sac of rabbits; 0.38 mg./ml. by injection in the tail's derma of mice, and 2.1 mg./ml. by injection in the juxta-ischiatic area of rats. These three concentrations refer to surface-, infiltration- and truncular-anesthesia respectively.

Generally speaking, in reporting pharmocological activities it is customary to compare the activities of novel compounds under consideration with those of known compounds. From a theoretical point of view this is not possible in the present case because there is no substance which exerts known surface anesthetic activities and which at the same time belongs to the same chemical class of which the compounds of the present invention (base and hydrochloride) are members. Lacking such a rational basis of comparison, there are set forth hereinafter the corresponding activities of procaine, which is a classical synthetic surface anesthetic. It is to be particularly noted that this comparison has only a certain orientation value, due to the different chemical nature and the probably different mode of action of the two substances.

Under the same experimental conditions described above, procaine showed an activity equal to that of o-diisopropylaminoethoxybutyrophenone (in the form of the hydrochloride) at the following concentrations:

| | Mg./ml. |
|---|---|
| Conjunctival sac of rabbits | 21.30 |
| Tail's derma of mice | 3.60 |
| Juxta-ischiatic area of rats | 6.00 |

From this data it is evident that o-diisopropylaminoethoxybutyrophenone is 28 times more active than procaine as surface anesthetic; 9.5 times more active in anesthesia by infiltration, and 2.9 times more active in truncular anesthesia.

o-Diisopropylaminoethoxybutyrophenone has therefore local anesthetic activities which are entirely unexpected in this chemical class and which are by far more potent than those of the classical and heretofore generally used local anesthetics.

It should be particularly noted that there is nothing of a comparable nature in the phenoxyethylpiperidine mentioned by the Bovets (Medicaments du systeme nerveux vegetif—S. Karger, Bâle, 1948—tab. at page 231) which has no substituents on the benzene nucleus. Reference may also be had to an article by Rolf-Eberhard Nitz et al. entitled "Zur Chemie und Antikonvulsiven Wirkung neuer Hydantoinderivate," in Arzneimittelforschung, 5, 1955, pp. 357–364, at 358, and to an article by L. Sorrentino et al., entitled "Primi Risultati della Sperimentazione Farmacologica e Clinica di un nuovo Coronarodilatotore: Dialicor" in Minerva Medica, 51, supplement to No. 70 (1960), pp. 2829–2839, at 2830.

While a specific example of a preferred method embodying the process of the present invention has been described above, it will be apparent that many changes and modifications may be made in the details of the method of procedure without departing from the true spirit of the invention. It will therefore be understood that the particular method set forth above is intended to be illustrative only, and is not intended to limit the scope of the invention which includes not only the described method, but also the described compounds, and is defined by the following claims.

What is claimed is:
1. A compound selected from the class consisting of o- diisopropylaminoethoxybutyrophenone having the formula:

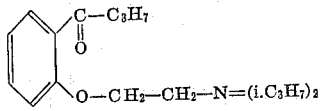

and the hydrochloride thereof.

2. o-Diisopropylaminoethoxybutyrophenone hydrochloride.

References Cited

UNITED STATES PATENTS

| | | | |
|---|---|---|---|
| 1,894,865 | 1/1933 | Hartman et al. | 260—570.7 |
| 2,921,092 | 1/1960 | Meltzer | 260—570.7 X |
| 2,995,489 | 8/1961 | Schmidt | 167—52 |
| 3,047,628 | 7/1962 | Goldberg | 260—570.7 |
| 3,053,731 | 9/1962 | Osterberg | 167—52 |
| 3,133,075 | 5/1964 | Clinton et al. | 260—570.7 X |
| 3,142,554 | 7/1964 | Godfrey | 260—570.7 X |

FOREIGN PATENTS 872,997   7/1961   Great Britain.

OTHER REFERENCES

Burger: "Medicinal Chemistry," 2nd ed., pp. 456–8 (1960).

Nitz et al.: "Chemical Abstracts," vol. 50, pp. 489–90 (1956).

CHARLES B. PARKER, *Primary Examiner.*

JULIAN S. LEVITT, *Examiner.*

J. D. GOLDBERG, R. V. HINES, *Assistant Examiners.*

UNITED STATES PATENT OFFICE
CERTIFICATE OF CORRECTION

Patent No. 3,335,184                                          August 8, 1967

Paolo Da Re et al.

It is hereby certified that error appears in the above numbered patent requiring correction and that the said Letters Patent should read as corrected below.

In the heading to the printed specification, line 6, for "Chemiques" read -- Chimiques --; column 1, lines 21 to 24, for the right-hand portion of the formula reading $(i.C_3H_7)$                read                  $(i.C_3H_7)_2$ Signed and sealed this 2nd day of July 1968.

(SEAL)
Attest:

Edward M. Fletcher, Jr.                             EDWARD J. BRENNER

Attesting Officer                                              Commissioner of Patents